(12) United States Patent
Knittel et al.

(10) Patent No.: US 9,284,871 B2
(45) Date of Patent: Mar. 15, 2016

(54) DOSING MODULE

(71) Applicant: Robert Bosch GmbH, Stuttgart (DE)

(72) Inventors: Achim Knittel, Ditzingen (DE);
Stephan Pohl, Schwieberdingen (DE);
Martin Kiontke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 14/357,390

(22) PCT Filed: Oct. 31, 2012

(86) PCT No.: PCT/EP2012/071546
§ 371 (c)(1),
(2) Date: May 9, 2014

(87) PCT Pub. No.: WO2013/068288
PCT Pub. Date: May 16, 2013

(65) Prior Publication Data
US 2014/0311130 A1 Oct. 23, 2014

(30) Foreign Application Priority Data

Nov. 9, 2011 (DE) .......................... 10 2011 086 017

(51) Int. Cl.
| | |
|---|---|
| *F01N 3/00* | (2006.01) |
| *F01N 3/10* | (2006.01) |
| *F01N 3/20* | (2006.01) |
| *F02M 53/04* | (2006.01) |

(52) U.S. Cl.
CPC ................ *F01N 3/20* (2013.01); *F01N 3/2066* (2013.01); *F01N 2260/024* (2013.01); *F01N 2610/02* (2013.01); *F01N 2610/11* (2013.01); *F01N 2610/1453* (2013.01); *F02M 53/043* (2013.01); *Y02T 10/24* (2013.01)

(58) Field of Classification Search
CPC ............ F01N 2610/02; F01N 2610/11; F01N 2610/1453; F01N 3/20; F01N 3/2066; F01N 2260/024; F02M 53/043; Y02T 10/24
USPC ............................ 60/286, 295, 301, 303, 298
See application file for complete search history.

(56) References Cited

U.S. PATENT DOCUMENTS

| | | | | |
|---|---|---|---|---|
| 5,605,042 | A | * | 2/1997 | Stutzenberger .................. 60/286 |
| 5,634,597 | A | * | 6/1997 | Krohn et al. ............... 239/585.5 |
| 6,192,677 | B1 | * | 2/2001 | Tost ................................ 60/286 |
| 6,526,746 | B1 | | 3/2003 | Wu |

FOREIGN PATENT DOCUMENTS

| | | |
|---|---|---|
| DE | 4436397 | 4/1996 |
| EP | 1662108 | 5/2006 |
| EP | 2192280 | 6/2010 |
| EP | 2503122 | 9/2012 |
| JP | 9096212 | 4/1997 |

OTHER PUBLICATIONS

International Search Report for Application No. PCT/EP2012/071546 dated Jan. 18, 2013 (English Translation, 2 pages).

* cited by examiner

*Primary Examiner* — Jesse Bogue
*Assistant Examiner* — Diem Tran
(74) *Attorney, Agent, or Firm* — Michael Best & Friedrich LLP

(57) ABSTRACT

The invention relates to a dosing module (10) for injecting a reduction agent, in particular a urea-water solution, into an exhaust pipe of an internal combustion engine, in particular of a self-igniting internal combustion engine, to reduce nitrogen oxides in the exhaust stream, wherein the dosing module has a main cooling element (12) through which a cooling liquid flows, in particular for cooling an injection valve (64) for the reduction agent. According to the invention, an additional cooling element (14), through which the cooling liquid likewise flows, in particular for cooling in the region of an electrical plug connection (22) and of an electromagnet (80) for actuating the injection valve (64), is placed on the basis cooling element (12), wherein a guide insert (30) for the cooling liquid is arranged in the main cooling element (12). As a result of the guide insert (30), priority cooling of the end section (72) of the injection valve (64) which is in direct contact with the hot exhaust stream of the internal combustion engine occurs. According to the invention, reliable operation of the dosing module (10) is ensured, even at ambient temperatures of 160° C. and above.

18 Claims, 5 Drawing Sheets

DOSING MODULE

BACKGROUND OF THE INVENTION

In modern motor vehicles with self-ignition internal combustion engines, continued tightening of exhaust emissions limits means that nitrogen oxides (NOx), among other constituents of the exhaust stream, must be reduced. One method employed for this purpose is catalytic reduction ("SCR method=Selective Catalytic Reduction") by means of an NOx reduction catalyst. In the course of this exhaust gas aftertreatment, a reduction agent is delivered with the aid of a pump from a storage reservoir to a dosing module, which is located in the region of the exhaust section of the internal combustion engine. By means of the dosing module, a precisely defined quantity of the reduction agent is fed intermittently into the exhaust stream upstream of the NOx reduction catalyst. A urea-water solution ("AdBlue®") is generally used as a reduction agent.

In order to be able to position the dosing module as close as possible to the exhaust stream, the lower section of the dosing module with the reduction agent injection nozzle situated therein is actively cooled. This ensures that a temperature of 120° C. is not exceeded in the region of the injection nozzle, even if the dosing module is arranged close to the exhaust gas. One disadvantage of this embodiment lies in the lack of cooling to the other subassemblies of the dosing module, in which the actuating magnet for the injection valve is generally arranged and in which the dosing module is connected by means of an electric connection. Owing to the only partial cooling, such a dosing module is not suitable for ambient temperatures of more than 160° C. since otherwise the plug connector and/or the coil of the actuating magnet could suffer permanent damage.

DE 44 36 397 A1 has disclosed a device for the aftertreatment of exhaust gases. In this case, a reduction agent is injected into an exhaust pipe with the aid of a dosing device upstream of a reduction catalyst.

Among the components of the dosing device are a control valve, a dosing valve and a cooling device. The cooling device is embodied as a cooling jacket. This is connected to the cooling water circuit of the internal combustion engine and ensures effective cooling of the dosing device, which is exposed to the high temperatures at the exhaust pipe during operation of a motor vehicle. However, the cooling jacket allows only partial cooling, and, as a result, there may be permanent damage to the electric actuating magnet and/or to the plug connection.

EP 2 192 280 A1 relates to a temperature management system for a dosing device for a urea-water solution in an exhaust system, wherein an injector is cooled. For this purpose, use is made of a cooling liquid taken from the engine cooling circuit. The cooling liquid flows through the injector in coolant ducts. Downstream of the injector, the cooling liquid is fed back into the engine cooling circuit.

DE 101 29 592 A1 discloses a dispensing arrangement for an onboard reduction agent in a motor vehicle. This comprises a housing, in which there is a pump for dispensing reduction agent. In operation, there is a flow of compressed air around the pump, wherein baffles guide the flow of compressed air around the pump. In this arrangement, there is turbulent mixing of the compressed air flow. This occurs in a region directly downstream of the compressed air inlet. As a result, the cooling effect of the compressed air on the components around which it flows is increased and, in addition, temperature control of the reduction agent to be injected is achieved. Active water cooling is not provided in this exhaust gas arrangement.

SUMMARY OF THE INVENTION

It is the object of the invention to provide a fully water cooled dosing module which can permanently withstand even high temperatures in the region of an exhaust pipe of a self-ignition internal combustion engine.

A disclosure is made of a dosing module for injecting a reduction agent, in particular a urea-water solution, into an exhaust pipe of an internal combustion engine, in particular of a self-ignition internal combustion engine, to reduce nitrogen oxides in the exhaust stream, wherein the dosing module has a main cooling element, through which a cooling fluid flows, in particular for cooling an injection valve for the reduction agent. According to the invention, an additional cooling element, through which the cooling fluid likewise passes, in particular for cooling in the region of an electrical plug connection and of an electromagnet for actuating the injection valve, is mounted on the main cooling element, wherein a guide insert for the cooling fluid is arranged in the main cooling element.

The guide insert results in optimum cooling of an injection valve end section, which comes into direct contact with the exhaust gas and in which an outlet opening for the reduction agent is also located. As a result, permanently fault-free operation of the dosing module is ensured, even at ambient temperatures of 160° C. or above. In combination with the additional cooling element mounted on the main cooling element, active cooling of the generally cooler (upper) subassemblies of the dosing module, which do not come into contact with the exhaust gas, in particular of the electromagnet for actuating the injection valve, of the electric plug connector and of the reduction agent feed, is ensured.

One embodiment of the dosing module envisages that the guide insert brings about a substantially u-shaped flow profile of the cooling fluid in the region of an end section of the injection valve.

As a result, the cooling fluid initially flows primarily around the lower end section of the injection valve, which is particularly hot and which comes into direct contact with the exhaust gas, while the somewhat cooler zones of the dosing module, in particular the electromagnet, the plug connector and the reduction agent feed, encounter a flow of cooling fluid and are cooled only secondarily.

In another embodiment of the dosing module, it is envisaged that an inlet stub for the cooling fluid is arranged in the region of the main cooling element, and that an outlet stub for the cooling fluid is arranged in the region of the additional cooling element.

As a result, the cooling water is fed to the dosing module in a zone at a particularly high temperature, while the heated cooling fluid is discharged in a somewhat cooler zone of the dosing module.

According to a development of the dosing module, the inlet stub and the outlet stub are connected to a cooling circuit of the internal combustion engine, and cooling water from the internal combustion engine is used as a cooling fluid.

As a result, the existing cooling circuit of the internal combustion engine can be involved in a simple manner in controlling the temperature of the dosing module.

According to another advantageous embodiment, the guide insert has an encircling flange having a stem which merges into a first tapering section. Together with the stem, the flange allows simple structural integration into a cooling device, especially a cooling element, of the dosing module. The stem of the guide insert is of substantially hollow cylindrical design, whereas the first tapering section has a slightly conical configuration.

In another embodiment of the dosing module, the first tapering section is adjoined by a central section, which merges into a second tapering section having at least two apertures.

Owing to the apertures at the bottom in the second tapering section, the cooling water is initially brought to the particularly hot, exhaust-facing end section of the injection valve and only after flowing through the latter does it enter the cooler zones in the region of the additional cooling element. A central section of the guide insert has an approximately hollow cylindrical shape in order to bring about the u-shaped flow around the injection valve end section radially surrounded by the main cooling element. A different shape of the central section from this is likewise possible, depending on the installation conditions.

In a development of the dosing module, a lower rim of the guide insert is penetrated by the at least two apertures so as to resemble a crown.

As a result, the formation in the cooling element of regions in which the prevailing flow velocity of the cooling fluid is only low is avoided. The apertures arranged in the region of the second (lower) tapering section, of which there are preferably at least six, each have a geometry which corresponds approximately to that of a split oval or that of a semicircle.

Another embodiment envisages that at least one drainage opening is provided between the main cooling element and the additional cooling element.

By means of this opening, the injection valve electromagnet, in particular, is protected from any spray that may have penetrated from the outside, which would otherwise not be able to flow off in a controlled manner. At the same time, the opening limits the maximum height to which the water that has penetrated can rise without risking permanent damage to the valve. A development of the dosing module envisages that the guide insert is formed by a metal material, in particular by sheet metal.

Simple manufacture, in particular manufacture by mass production, by means of known production methods and machines is thereby possible. Moreover, the metal material ensures adequate temperature stability. If appropriate, it is also possible to replace a metal material with a high-performance thermosetting plastic or thermoplastic of adequate heat resistance, possibly reinforced with reinforcing fibers.

BRIEF DESCRIPTION OF THE DRAWINGS

The invention will be described in greater detail below by means of the drawing, in which.

DETAILED DESCRIPTION

Figure 1:
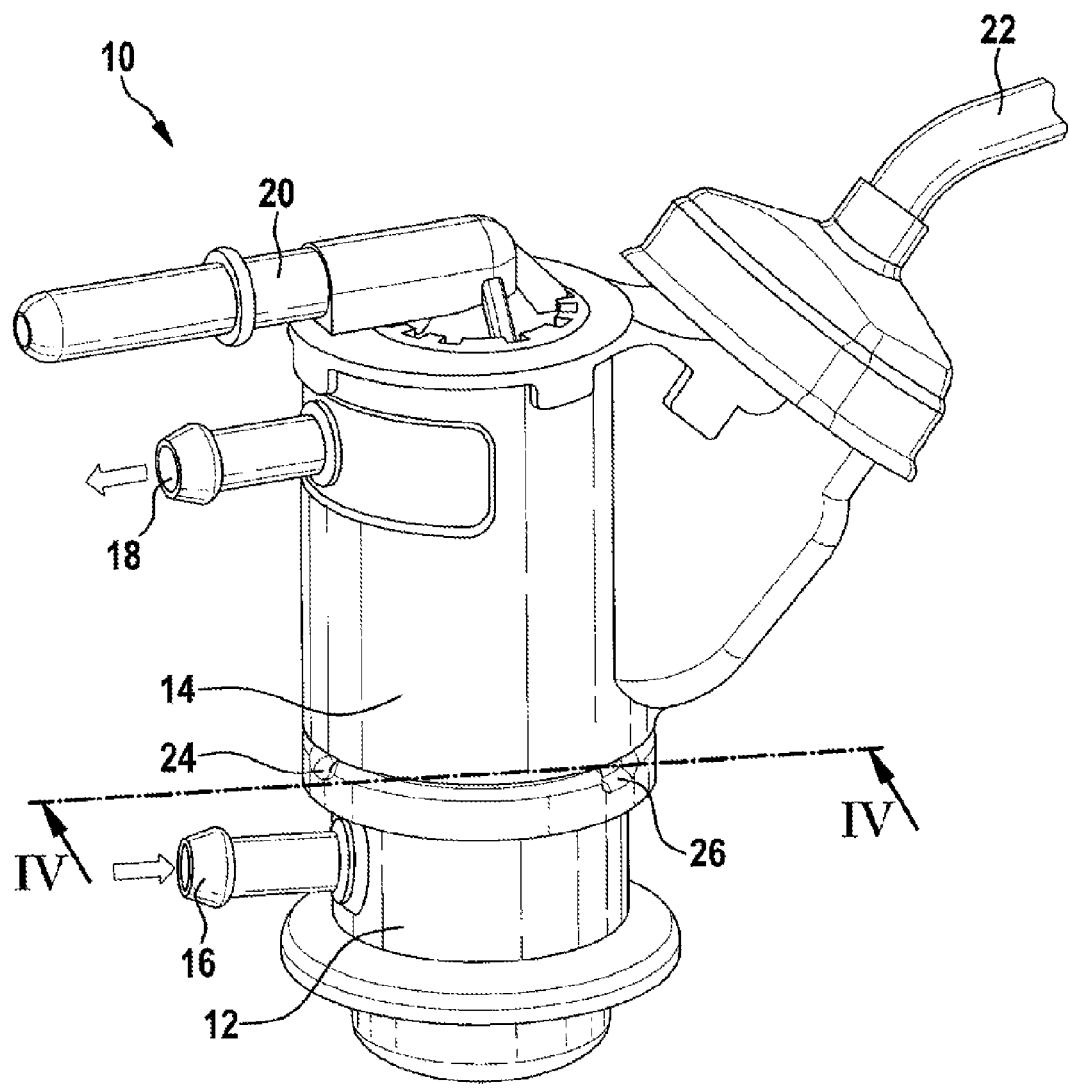
FIG. 1 shows a schematic perspective view of a water cooled dosing module.

FIG. 1 shows a diagrammatic representation of a water cooled dosing module according to the invention for injecting a reduction agent into an exhaust stream of a self-ignition internal combustion engine.

A dosing module 10 comprises, inter alia, a main cooling element 12, on which an additional cooling element 14 is mounted. The main cooling element 12 has a tubular inlet stub 16 for feeding in a cooling fluid, which is preferably cooling water from a cooling circuit of a self-ignition internal combustion engine (not shown here). The additional cooling element 14 is furthermore provided with an outlet stub 18 for discharging the cooling water fed in. Starting from the inlet stub 16, the cooling water first of all flows through the main cooling element 12 and, from there, passes into the additional cooling element 14, and leaves the latter again via the outlet stub 18. The cooling water flows counter to the temperature profile (temperature gradient) prevailing in the dosing module 10 from the hotter main cooling element 12 into the additional cooling element 14, which is cooler relative to the latter. Here, the main cooling element 12 and the additional cooling element 14 mounted thereon are designed as cooling jackets made from formed sheet metal of a suitable material thickness, which are divided into at least two parts and through which the cooling water can flow. The internally hollow cooling elements 12, 14, which each have an approximately cylindrical external geometry, ensure that the dosing module 10 can be operated sustainably and reliably, even at ambient temperatures in the region of 160° C. or above—of the kind which may easily occur in the region of exhaust stream or in the vicinity of an exhaust pipe of an internal combustion engine.

In addition, a feed 20 for the reduction agent and an electric plug connection 22 are connected at the top to the additional cooling element 14. Via the feed 20, the dosing module 10 is supplied with a suitable reduction agent, in particular an aqueous urea-water solution ("AdBlue®"). The reduction agent is delivered with the aid of a pump from a storage tank into a connecting line (not shown), which is connected to the feed 20. By means of the dosing module 10, the reduction agent is injected at intermittent time intervals and in a precisely dosed quantity into an exhaust pipe (likewise not shown) of the internal combustion engine. Here, the injection of the reduction agent with the aid of the dosing module 10 is performed upstream of a reducing catalyst required for the chemical reaction process to take place in the SCR method. Between the main cooling element 12 and the additional cooling element 14 there are small drainage openings, of which two front openings can be seen and here bear the reference numerals 24 and 26.

Figure 2:
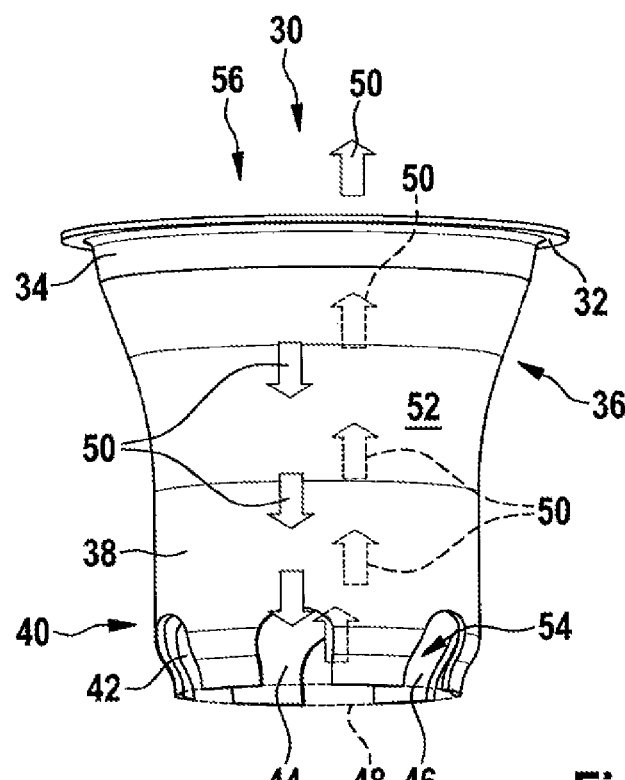
FIG. 2 shows an isometric side view of a guide insert.
Figure 3:
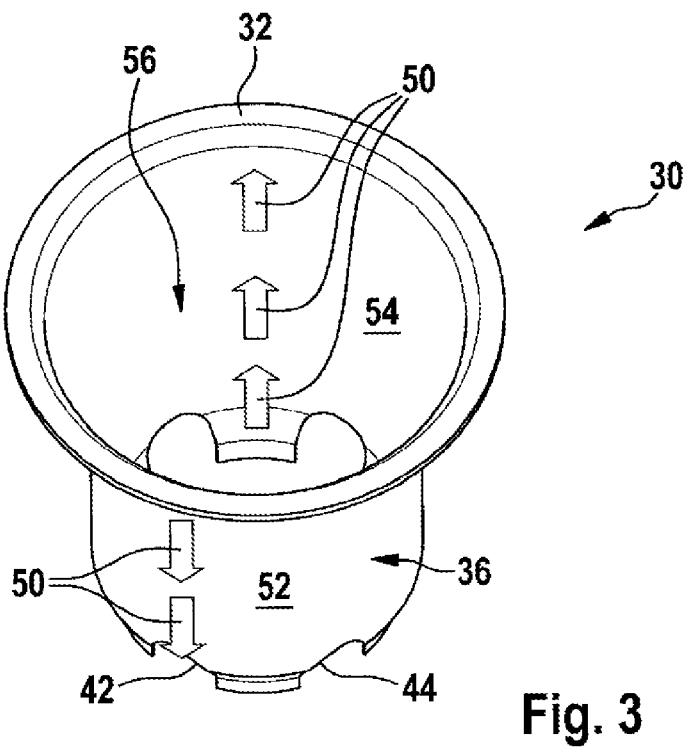
FIG. 3 shows an isometric view of a guide insert according to the invention, obliquely from above.

FIGS. 2 and 3, to which reference will be made simultaneously in the rest of the description, show a (cooling water) guide insert according to the invention in a perspective side view and in an isometric illustration obliquely from above. A substantially tubular guide insert 30 for the cooling water comprises inter alia a flange 32 in the form of a circular ring, which continues downward into a hollow cylindrical stem 34. Inter alia, the stem 34 makes it easier to center the guide insert 30 within the lower cooling element. The stem 34 merges into a slightly conical first tapering section 36, which is adjoined by a substantially hollow cylindrical central section 38. As a departure from the illustrated hollow cylindrical configuration of the central section 38, said section can have a different spatial configuration, in particular depending on the geometrical proportions of the main cooling element. Adjoining the central section 38 is a second tapering section 40. In the illustrated embodiment shown, a total of six apertures are introduced into the tapering section 40, only three front apertures 42, 44, 46 being provided with reference numerals. The apertures pass through or penetrate a (lower) rim 48 of the guide insert 30, i.e. the apertures are open at the bottom. Among the effects is that the formation of spatial zones within the cooling elements in which a flow velocity of the cooling water falls to a very low value or to zero is avoided.

Here, the apertures have a geometrical shape which corresponds approximately to that of an oval split approximately in half and they are preferably introduced into the second tapering section 40 in a manner uniformly distributed over the circumference thereof. An alternative geometrical configuration, e.g. that of semicircular apertures, is likewise possible. Moreover, a different number of apertures, which may additionally be distributed non-uniformly over the circumference, can be provided. A number and/or a cross-sectional area of the apertures is dimensioned in such a way that an optimum passage of cooling water for the cooling of the dosing module is ensured in all operating states of the internal combustion engine.

During the operation of the dosing module, the flow profile 50 of the cooling water initially runs parallel to an outer surface 52 of the guide insert 30, then passes through the six apertures and finally runs back again parallel to an inner surface 54 of the guide insert 30, through a central opening 56 in the guide insert 30.

Figure 4:
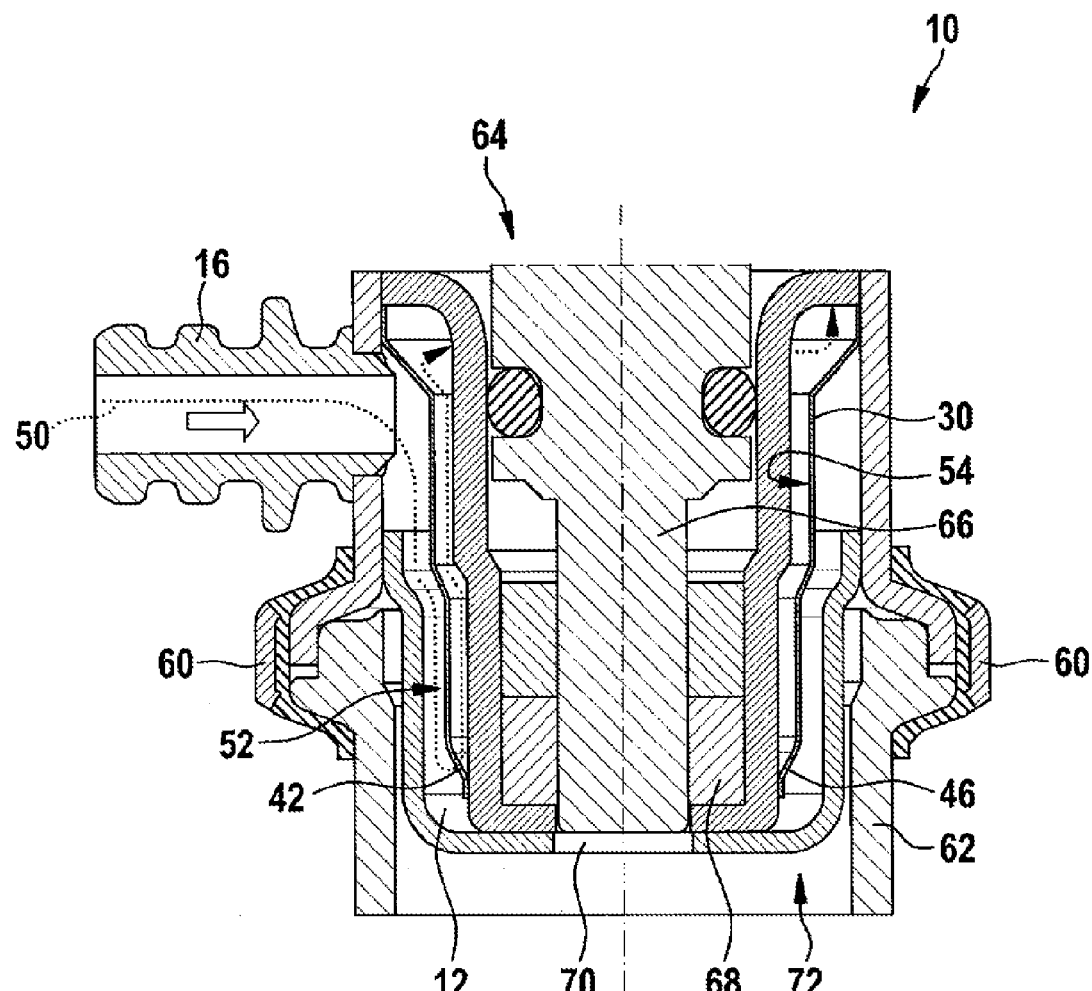
FIG. 4 shows a simplified cross section through the (lower) main dosing-module cooling element closest to the exhaust gas, along section line IV-IV in FIG. 1.

FIG. 4 illustrates a simplified (partial) cross section through the (lower) main dosing-module cooling element closer to the exhaust, along section line IV-IV in FIG. 1. The dosing module 10 is secured by means of a clamp 60 on an exhaust pipe stub 62 of an exhaust pipe (not shown specifically) of the internal combustion engine. An injection valve 64 are arranged within the dosing module 10 comprises, inter alia, a valve needle 66, which is accommodated with the ability for vertical movement in a guide 68. By means of the valve needle 66, an outlet opening 70 can be opened and closed intermittently in order to enable a precisely defined quantity of the reduction agent to be injected. The vertical movement of the valve needle 66 is accomplished by means of an electromagnet (not shown in FIG. 4). The guide 68, a lower tip (not designated) of the valve needle 66 and the outlet opening 70 for the reduction agent are located in an end section 72 of the injection valve 64, which comes into direct contact with the exhaust stream of the internal combustion engine and is therefore exposed to very high temperatures. The cooling water from the cooling circuit of the internal combustion engine passes through the inlet stub 16 into the main cooling element 12 and is guided around the particularly hot end section 72 of the injection nozzle 64, in the direction of the approximately u-shaped flow profile 50 indicated by a dotted line, by the action of the guide insert 30. As a result, the end section 72 of the injection nozzle 64, which is exposed to high temperatures, is given priority cooling in accordance with the invention, thus ensuring that the dosing module 10 functions reliably, even at ambient temperatures of 160° C. or above. During this process, the cooling water flows initially along the outer surface 52 of the guide insert 30, flows through the bottom apertures 42, 46 in the guide insert 30 and then travels back on the inner surface 54 thereof, and upward to the cooler subassemblies (not shown specifically in FIG. 4) of the dosing module 10 in the region of the additional cooling element, which is mounted on the main cooling element 12 but is not shown here.

Figure 5:
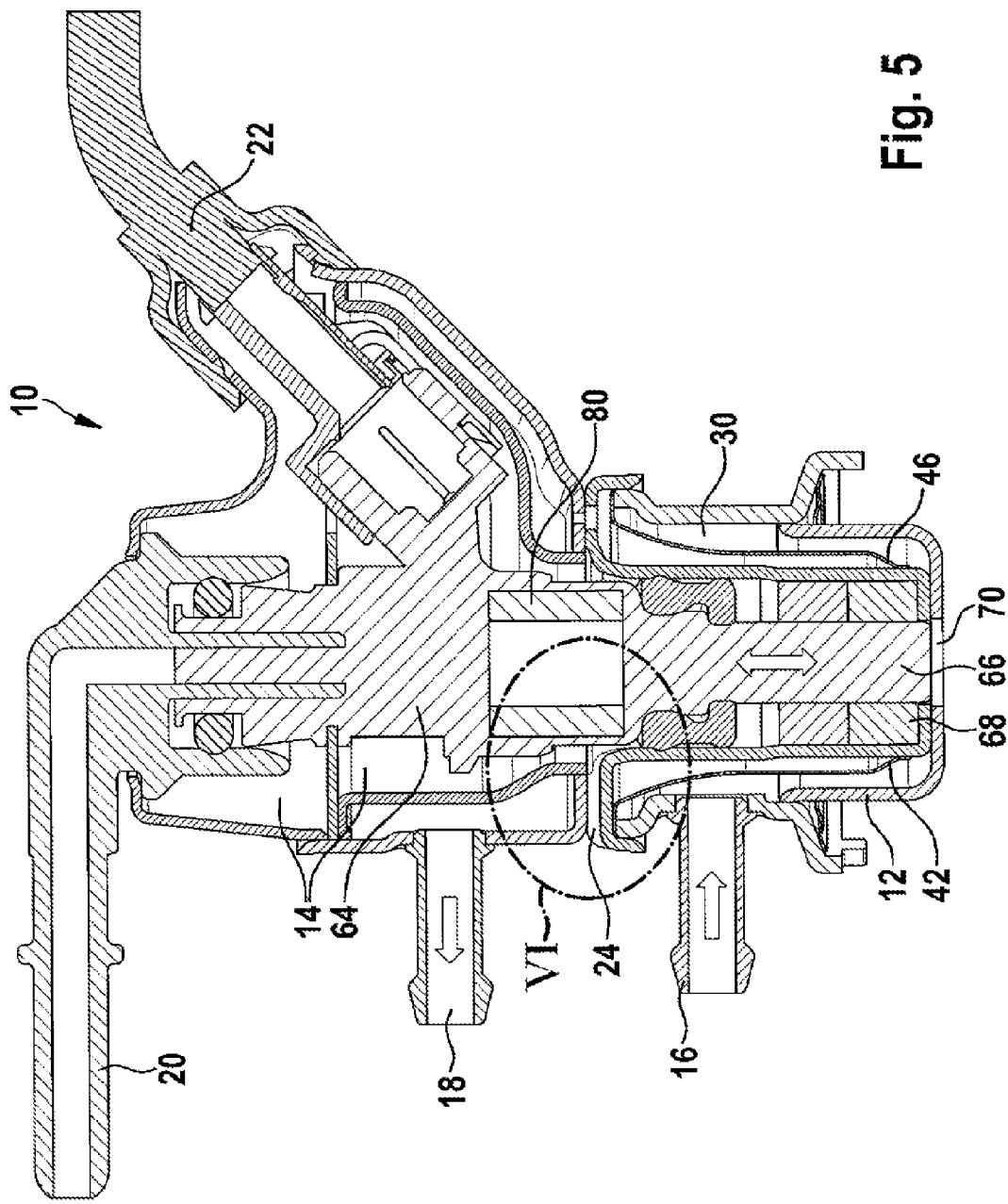
FIG. 5 shows a complete longitudinal section through the water cooled dosing module.

FIG. 5 illustrates a complete longitudinal section through the water cooled dosing module.

The dosing module 10 is introduced into the cooling circuit (not shown) of the internal combustion engine by means of the inlet stub 16 and of the outlet stub 18. The inlet stub 16 is formed on the main cooling element 12, while the outlet stub 18 is connected to the additional cooling element 14 in a hydraulic joint. The reduction agent is fed in via the feed 20, while the dosing module 10 is supplied with electric energy via the watertight plug connection 22. The guide insert 30 with the apertures 42, 46 is accommodated in the main cooling element 12. By means of an electromagnet 80, the valve needle 66 can be moved vertically up and down in the guide 68 in order to implement the intermittent opening and closure of the outlet opening 70 of the injection valve 64. The electromagnet 80 and therefore the valve needle 66 are controlled by means of an electronic open-loop and/or closed-loop control unit (not shown) in accordance with the operating state of the self-ignition internal combustion engine. The drainage opening 24 prevents spray that penetrates from outside from remaining permanently behind, especially in the region of the electromagnet 80, which is encapsulated by electrical insulation.

Figure 6:
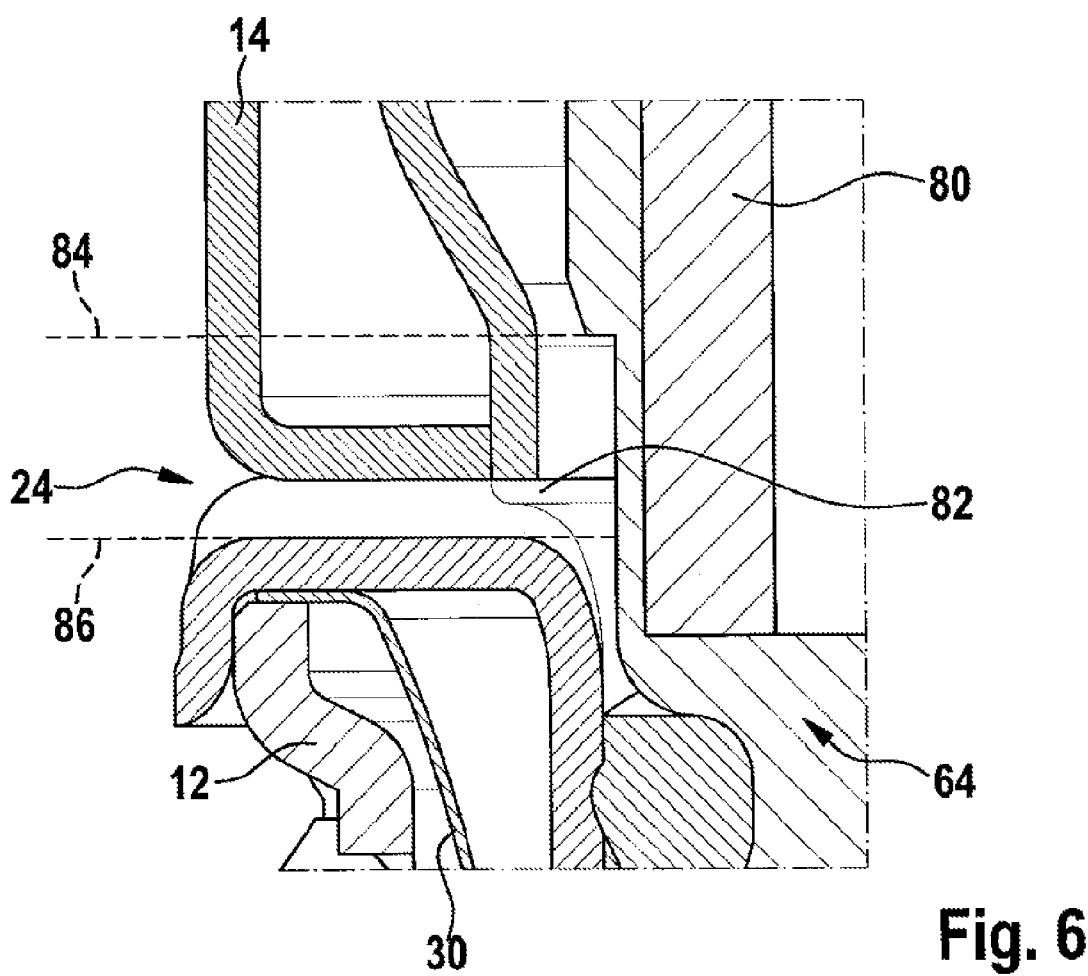
FIG. 6 shows an enlarged illustration of the detail VI in FIG. 5.

FIG. 6 shows an enlarged illustration of the detail VI from FIG. 5. The drainage opening 24 is situated between the main cooling element 12 with the guide insert 30 and the mounted additional cooling element 14. The drainage opening 24 ensures, inter alia, that spray 82 which penetrates the dosing module from outside can at most rise only temporarily as far as a maximum level 84. If the maximum level 84 is exceeded, permanent damage to the injection valve 64 or to the encapsulated electromagnet 80 within the dosing module could otherwise occur. Statically, the spray 82 cannot exceed a minimum level 86.

The invention claimed is:

1. A dosing module (10) for injecting a reduction agent into an exhaust pipe of an internal combustion engine, to reduce nitrogen oxides in an exhaust stream of the internal combustion engine, wherein the dosing module has a main cooling element (12), through which a cooling fluid flows for cooling an injection valve (64) for the reduction agent, characterized in that an additional cooling element (14), through which the cooling fluid passes for cooling in the region of an electrical plug connection (22) and of an electromagnet (80) for actuating the injection valve (64), is mounted on the main cooling element (12), wherein a guide insert (30) for the cooling fluid is arranged in the main cooling element (12).

2. The dosing module (10) as claimed in claim 1, wherein the guide insert (30) brings about a substantially u-shaped flow profile (50) of the cooling fluid in a region of an end section (72) of the injection valve (64).

3. The dosing module (10) as claimed in claim 1, wherein an inlet stub (16) for the cooling fluid is arranged in a region of the main cooling element (12), and an outlet stub (18) for the cooling fluid is arranged in a region of the additional cooling element (14).

4. The dosing module (10) as claimed in claim 1, wherein the inlet stub (16) and the outlet stub (18) are connected to a cooling circuit of the internal combustion engine, and cooling water from the internal combustion engine is used as a cooling fluid.

5. The dosing module (10) as claimed in claim 1, wherein the guide insert (30) has an encircling flange (32) having a stem (34) which merges into a first tapering section (36).

6. The dosing module (10) as claimed in claim 5, wherein the first tapering section (36) is adjoined by a central section (38), which merges into a second tapering section (40) having at least two apertures (42-46).

7. The dosing module (10) as claimed in claim 6, wherein a lower rim (48) of the guide insert (30) is penetrated by the at least two apertures (42-46) so as to resemble a crown.

8. The dosing module (10) as claimed in claim 1, wherein at least one drainage opening (24, 26) is provided between the main cooling element (12) and the additional cooling element (14).

9. The dosing module (10) as claimed in claim 1, wherein the guide insert (30) is formed by a metal material.

10. A dosing module (10) for injecting a urea-water solution into an exhaust pipe of a self-ignition internal combustion engine to reduce nitrogen oxides in an exhaust stream of the internal combustion engine, wherein the dosing module has a main cooling element (12), through which a cooling fluid flows for cooling an injection valve (64) for the urea-water solution, characterized in that an additional cooling element (14), through which the cooling fluid passes for cooling in a region of an electrical plug connection (22) and of an electromagnet (80) for actuating the injection valve (64), is mounted on the main cooling element (12), wherein a guide insert (30) for the cooling fluid is arranged in the main cooling element (12).

11. The dosing module (10) as claimed in claim 10, wherein the guide insert (30) brings about a substantially u-shaped flow profile (50) of the cooling fluid in a region of an end section (72) of the injection valve (64).

12. The dosing module (10) as claimed in claim 11, wherein an inlet stub (16) for the cooling fluid is arranged in a region of the main cooling element (12), and an outlet stub (18) for the cooling fluid is arranged in a region of the additional cooling element (14).

13. The dosing module (10) as claimed in claim 12, wherein the inlet stub (16) and the outlet stub (18) are connected to a cooling circuit of the internal combustion engine, and cooling water from the internal combustion engine is used as a cooling fluid.

14. The dosing module (10) as claimed in claim 13, wherein the guide insert (30) has an encircling flange (32) having a stem (34) which merges into a first tapering section (36).

15. The dosing module (10) as claimed in claim 14, wherein the first tapering section (36) is adjoined by a central section (38), which merges into a second tapering section (40) having at least two apertures (42-46).

16. The dosing module (10) as claimed in claim 15, wherein a lower rim (48) of the guide insert (30) is penetrated by the at least two apertures (42-46) so as to resemble a crown.

17. The dosing module (10) as claimed in claim 16, wherein at least one drainage opening (24, 26) is provided between the main cooling element (12) and the additional cooling element (14).

18. The dosing module (10) as claimed in claim 17, wherein the guide insert (30) is formed by sheet metal.

\* \* \* \* \*